(12) United States Patent
Yousef

(10) Patent No.: US 7,782,903 B2
(45) Date of Patent: Aug. 24, 2010

(54) HARDWARE ACCELERATED PROTOCOL STACK

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 197 days.

(21) Appl. No.: 12/120,487

(22) Filed: May 14, 2008

(65) Prior Publication Data

US 2009/0285096 A1 Nov. 19, 2009

(51) Int. Cl.
H04J 3/16 (2006.01)
H04J 3/22 (2006.01)
(52) U.S. Cl. ........................... 370/469; 370/474
(58) Field of Classification Search ............... 370/469, 370/349, 474
See application file for complete search history.

(56) References Cited

U.S. PATENT DOCUMENTS

| | | | | |
|---|---|---|---|---|
| 6,393,487 | B2 * | 5/2002 | Boucher et al. | 709/238 |
| 2005/0113102 | A1 * | 5/2005 | Kwon et al. | 455/450 |
| 2006/0204005 | A1 * | 9/2006 | Hassan et al. | 380/44 |
| 2006/0256708 | A1 * | 11/2006 | Wang et al. | 370/206 |
| 2007/0070970 | A1 * | 3/2007 | Collins et al. | 370/349 |

OTHER PUBLICATIONS

J. Van der Meer, RTP payload format for transport of MPEG-4 Elementary Streams, RFC, Nov. 2003, Network Working Group, Entire document.*

* cited by examiner

*Primary Examiner*—Derrick W Ferris
*Assistant Examiner*—Maharishi Khirodhar
(74) *Attorney, Agent, or Firm*—Rahman LLC

(57) ABSTRACT

Protocol stack layer processing for a MediaFLO™ mobile multimedia multicast system comprising a transmitter comprising a host processor and a host memory component. The processing includes a receiver that receives a wireless data stream comprising a MediaFLO™ mobile multimedia multicast system superframe comprising any of audio, video, and text media frames arranged in multiplexed Multicast Logical Channels (MLCs) and received from the transmitter, wherein each MLC is divided into 16 byte data packets, and wherein each MLC carries up to three logical sub-channels comprising stream 2, stream 1, and stream 0; and an Application Specific Integrated Circuit (ASIC) memory component operatively connected to the receiver, wherein the ASIC memory component performs processing of the data packets using hardware components comprising, a Medium Access Control (MAC) layer core; a stream layer core; a decryption layer core; a defragmentation layer core; and a sync layer core.

20 Claims, 10 Drawing Sheets

HARDWARE ACCELERATED PROTOCOL STACK

BACKGROUND

1. Technical Field

The embodiments herein generally relate to wireless communications, and, more particularly, to physical layer processing in MediaFLO™ (Forward Link Only) mobile multimedia multicast systems.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting—Terrestrial (ISDB-T), Terrestrial-Digital Multimedia Broadcasting (T-DMB), Satellite—Digital Multimedia Broadcasting (S-DMB), Digital Video Broadcasting—Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver.

Typically, physical layer processing is performed in hardware while other layers in a MediaFLO™ system protocol stack are performed in software on the host processor starting from the MAC Layer. The problem arises when some operations such as Reed-Solomon (RS) decoding, cyclic redundancy check (CRC) checking, defragmentation, and decryption are performed on the host processor. Using software components only to handle protocol stack processing in MediaFLO™ has the following problems. First, operations such as a CRC check, defragmentation, and decryption consume CPU cycles on the host processor. Processing is measured in million instructions per second (MIPS) per Multicast Logical Channel (MLC), which means that the above-mentioned operations typically require between 70 to 90 MIPS/MLC which is a large value that: (a) competes with other applications running on the host processor on the CPU usage (e.g. audio/video codec); (b) introduces extra overhead when data that shall be discarded by the protocol stack (due to errors or certain algorithm constrains) is copied from the application specific integrated circuit (ASIC) receiver memory; and (c) shortens battery life for battery powered devices as processing can be translated to consumed power (approximately 0.04 mW/MIPS). The second problem that arises involves copying data from the ASIC receiver memory to the host processor memory consumes memory space from the memory attached to the host processor as well as burns more power.

SUMMARY

In view of the foregoing, an embodiment herein provides an apparatus that performs protocol stack layer processing for a MediaFLO™ (Forward Link Only) mobile multimedia multicast system comprising a transmitter comprising a host processor and a host memory component, the apparatus comprises a receiver that receives a wireless data stream comprising a MediaFLO™ mobile multimedia multicast system superframe comprising any of audio, video, and text media frames arranged in multiplexed Multicast Logical Channels (MLCs) and received from the transmitter, wherein each MLC is divided into 16 byte data packets, and wherein each MLC carries up to three logical sub-channels comprising stream 2, stream 1, and stream 0; and an Application Specific Integrated Circuit (ASIC) memory component operatively connected to the receiver, wherein the ASIC memory component performs processing of the data packets using hardware components comprising a Medium Access Control (MAC) layer core that processes the data packets by deinterleaving the data packets, performing Reed-Solomon (RS) decoding of the deinterleaved data packets, and removing parity bits from decoded data packets; a stream layer core that extracts the stream 0 from MLC, sends the stream 0 to the host processor, and receives a decryption key from the host processor; a decryption layer core that decrypts the processed data packets; a defragmentation layer core that removes a fragmentation header located at a beginning of each fragment of the data packets, processes Cyclic Redundancy Checks (CRCs) on the data packets, and constructs a service layer packet; and a sync layer core that parses a sync header from the media frames, and identifies the type of the media frames being transmitted.

Furthermore, upon completion of the parsing process performed by the sync layer core, the receiver informs the host processor for reading data components of the wireless data stream from the ASIC memory component; wherein the host processor provides the data components to a codec to decode and play any of audio, video, and text media content. Furthermore, the type of the media frames being transmitted comprises any of a random access point (RAP) frame and a non-RAP frame, wherein when there is any of a channel switching event and an error event, the sync layer retains a RAP version of a particular frame to be written in the ASIC memory component and overwrites memory containing a non-RAP version of the particular frame; wherein the sync layer overwrites memory containing a RAP version of a particular frame to be written in the ASIC memory component, and retains a non-RAP version of the particular frame.

Moreover, the processing is performed in place in the ASIC memory component, wherein the in place indicates that only one byte is removed and three bytes are added in the defragmentation layer core, wherein the decryption layer core decrypts the processed data packets using decryption keys using an Advance Encryption Standard (AES) 128 bits counter mode descrambler; the defragmentation layer core determines a length of each service packet from a respective fragmentation header, and places three empty bytes in place of the removed bytes in a service packet header, wherein the defragmentation layer core saves a memory address of the placed three empty bytes in the ASIC memory component separately; processes fragments of a current data packet until a last fragment is processed; computes a length of the processed service packet; re-enters the three empty bytes in the memory address of the service packet header from its saved address; configures fragment headers bit containing the last fragment information; and places service packet length information in the service packet header.

Another embodiment includes a method for protocol stack layer processing for a MediaFLO™ (Forward Link Only) mobile multimedia multicast system comprising a transmitter comprising a host processor and a host memory component, the method comprises a receiver that receives a wireless data stream comprising a MediaFLO™ mobile multimedia multicast system superframe comprising any of audio, video, and text media frames arranged in multiplexed MLCs and received from the transmitter, wherein each MLC is divided into 16 byte data packets, and wherein each MLC carries up to three logical sub-channels comprising stream 2, stream 1, and stream 0; and an ASIC memory component operatively connected to the receiver, wherein the ASIC memory component performs processing of the data packets using hardware components comprising a MAC layer core that processes the data packets by deinterleaving the data packets, performing RS decoding of the deinterleaved data packets, and removing parity bits from decoded data packets; a stream layer core that extracts the stream 0 from MLC, sends the stream 0 to the host processor, and receives a decryption key from the host processor; a decryption layer core that decrypts the processed data packets; a defragmentation layer core that removes a fragmentation header located at a beginning of each fragment of the data packets, processes CRCs on the data packets, and constructs a service layer packet; and a sync layer core that parses a sync header from the media frames, and identifies the type of the media frames being transmitted.

Additionally, upon completion of the parsing process performed by the sync layer core, the receiver informs the host processor for reading data components of the wireless data stream from the ASIC memory component, wherein the host processor provides the data components to a codec to decode and play any of audio, video, and text media content. Furthermore, the type of the media frames being transmitted comprises any of a RAP frame and a non-RAP frame, wherein when there is any of a channel switching event and an error event, the sync layer retains a RAP version of a particular frame to be written in the ASIC memory component and overwrites memory containing a non-RAP version of the particular frame; wherein the sync layer overwrites memory containing a RAP version of a particular frame to be written in the ASIC memory component, and retains a non-RAP version of the particular frame.

Furthermore, the method is performed in place in the ASIC memory component, wherein the in place indicates that only one byte is removed and three bytes are added in the defragmentation layer core; wherein the decryption layer core decrypts the processed data packets using decryption keys using an AES 128 bits counter mode descrambler; the defragmentation layer core determines a length of each service packet from a respective fragmentation header, and places three empty bytes in place of the removed bytes in a service packet header, wherein the defragmentation layer core saves a memory address of the placed three empty bytes in the ASIC memory component separately; processes fragments of a current data packet until a last fragment is processed; computes a length of the processed service packet; re-enters the three empty bytes in the memory address of the service packet header from its saved address; configures fragment headers bit containing the last fragment information; and places service packet length information in the service packet header.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
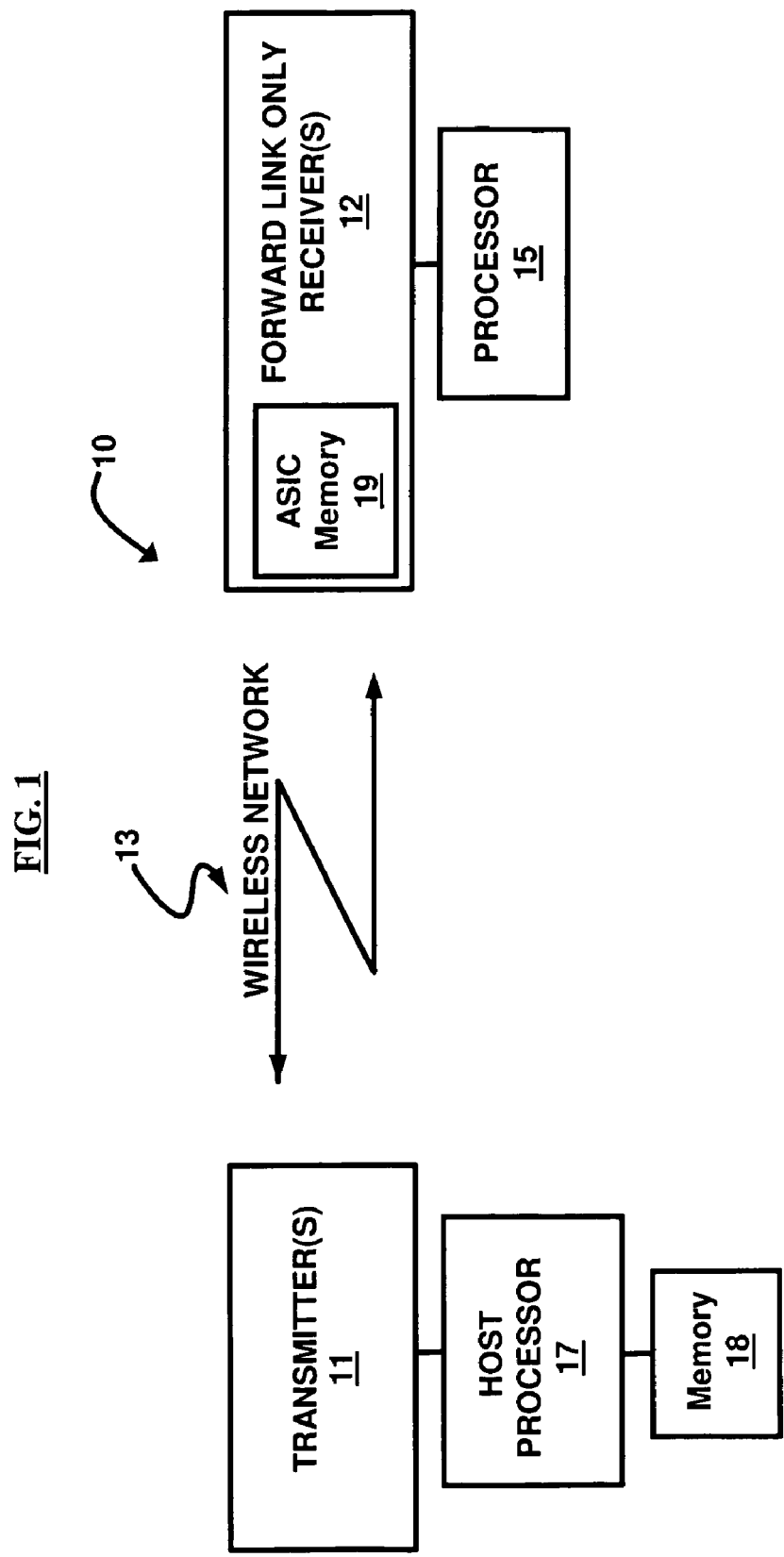
FIG. 1 illustrates a MediaFLO™ system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique to decrease the size of data transferred from a demodulator to a host processor in order to optimize the total processing performed by the host and achieving this without increasing the complexity of the hardware significantly. Referring now to the drawings, and more particularly to FIGS. 1 through 10, where similar reference characters denote corresponding features consistently throughout the figures, there are shown preferred embodiments.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 10 for a MediaFLO™ system. The system 10 includes one or more transmitters 11 that communicate across a wireless network 13 to one or more receivers 12. One or more processors 15 may be operatively connected to the one or more receivers 12 to facilitate processing of computer instructions to be utilized by the one or more receivers 12. Furthermore, one or more host processors 17 with attached memory 18 may be operatively connected to the one or more transmitters 11. Moreover, each receiver 12 comprises ASIC memory 19.

The FLO system 10 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), DVD-T, and ISDB-T. To ensure that the user experience is as uniform as possible over the entire coverage area and optimize spectral efficiency and network economics, FLO system 10 employs the concept of Single Frequency Network (SFN) operation.

The FLO system 10 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called MLCs. An important aspect is that MLCs are distinguishable at the physical layer. For example, the video and audio components of a given service can be sent on two different MLCs. A FLO device (a receiver from the plurality of receivers 12) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 12 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

Figure 2:
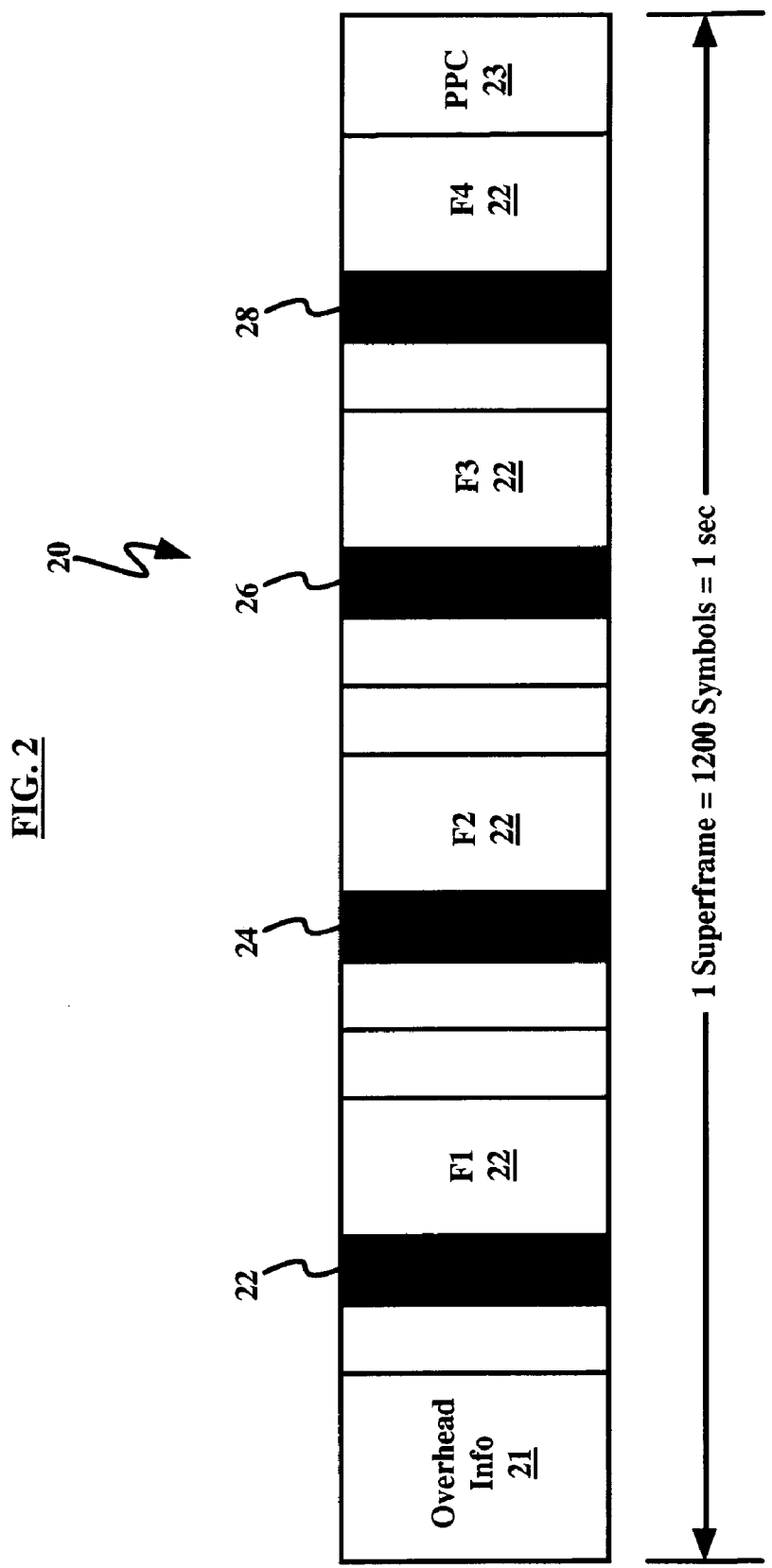
FIG. 2 illustrates a FLO superframe for a MediaFLO™ system according to an embodiment herein.

MLCs are multiplexed to form a superframe. FIG. 2 illustrates a FLO superframe 20 for a MediaFLO™ system. The superframe 20 includes an Overhead Information Channel 21, MLCs 22, 24, 26, 28, data channels 22, and a Position Pilot Channel (PPC) 230, wherein the PPC 23 is a collection of OFDM symbols that may appear near the end of the superframe 20. The PPC 23 may be used by a receiver (e.g., a receiver from the plurality of receivers 12 of FIG. 1) to estimate the received power levels and channel estimates from individual transmitters 11 of FIG. 1.

In MediaFLO™ mobile TV systems, a service is an aggregation of one or more independent data components (e.g., audio, video, etc.). Each independent data component of a service is called a flow. As mentioned, services are carried on logical channels called MLCs, and namely, stream 2 (S2), stream 1 (S1), and stream 0 (S0). The multiplex of MLCs that is transmitted every second is called a superframe. Services that carry audio and video content are called real-time services. Real-time services typically require special handling due to real-time constrains of audio and video playing and synchronization.

The MLC contents are received from the air into the ASIC receiver memory 19. The receiver 12 works on these MLCs according to MediaFLO™ system protocol stack layers 100 (of FIG. 3) in which each layer is a collection of related functions performed on the MLC flow. When the MLC reception is complete, software running on the host processor 17 is informed that MLC data for this superframe is loaded in the ASIC receiver memory 19. The software reserves memory for the content of the MLC from the memory 18 attached to the host 17. Moreover, the software uses any suitable technique to read the ASIC receiver memory 19.

Figure 3:
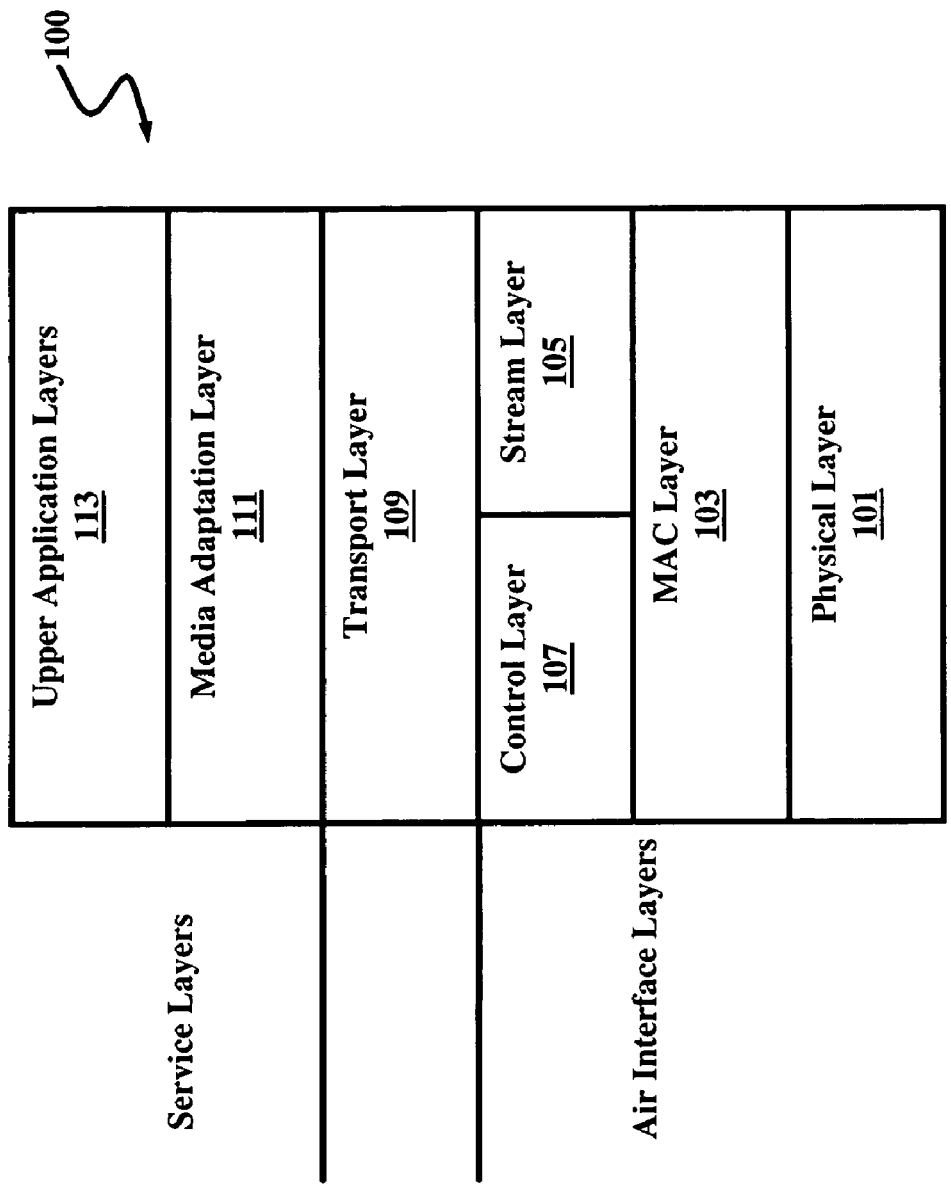
FIG. 3 is a block diagram illustrating MediaFLO™ system protocol stack layers used in accordance with the embodiments herein.

Furthermore, the software processes the MLC content through the protocol stack layers 100 to retrieve real-time service components such as audio, video, timed data, etc. Additionally, the software supplies the extracted data components to the codec to decode and play the content. The codec is a device or program capable of performing encoding and decoding on a digital data stream/signal. It is mainly used for hardware. The codec encodes a stream or data signal for transmission, storage or encryption and decoding it for viewing or editing. The functions of each layer (of the air interface layers and service layers) of the stack architecture 100 at the receiver shown in FIG. 3 is summarized as follows.

The physical layer 101 is the most basic network layer, providing the means of receiving raw bits over a physical data link. The medium access control (MAC) layer 103 performs the multiplexing of packets belonging to different media streams associated with MLCs. It is also responsible for coding/decoding (for error detection and correction using Reed-Solomon coders) and interleaving/de-interleaving of blocks of 16 bytes of data packets. The stream layer 105 provides for separation of streams to upper layer flows on an MLC-by-MLC basis. The stream layer 105 is at the same level as the control layer 107 in the air interface layering architecture. The device uses a control layer 107 to maintain synchronization of its control information with that in the network. The transport layer 109 comprises of two sub-layers (not shown): (1) the stream encryption/decryption layer wherein the set of frames delivered in a particular second for a particular flow, forming a stream layer packet in the superframe may be encrypted and decrypted in the stream encryption/decryption layer; (2) the framing layer, which extracts the sequence of service packets from a received and decrypted stream packet, processing and removing the cyclic redundancy checks (CRCs) (appended bits for error detection) if present, and delivering the resultant sequence of service packets to the service layer. If errors are detected in the decoding process, the framing layer in the device may signal the presence to errors to the service layer.

Figure 5:
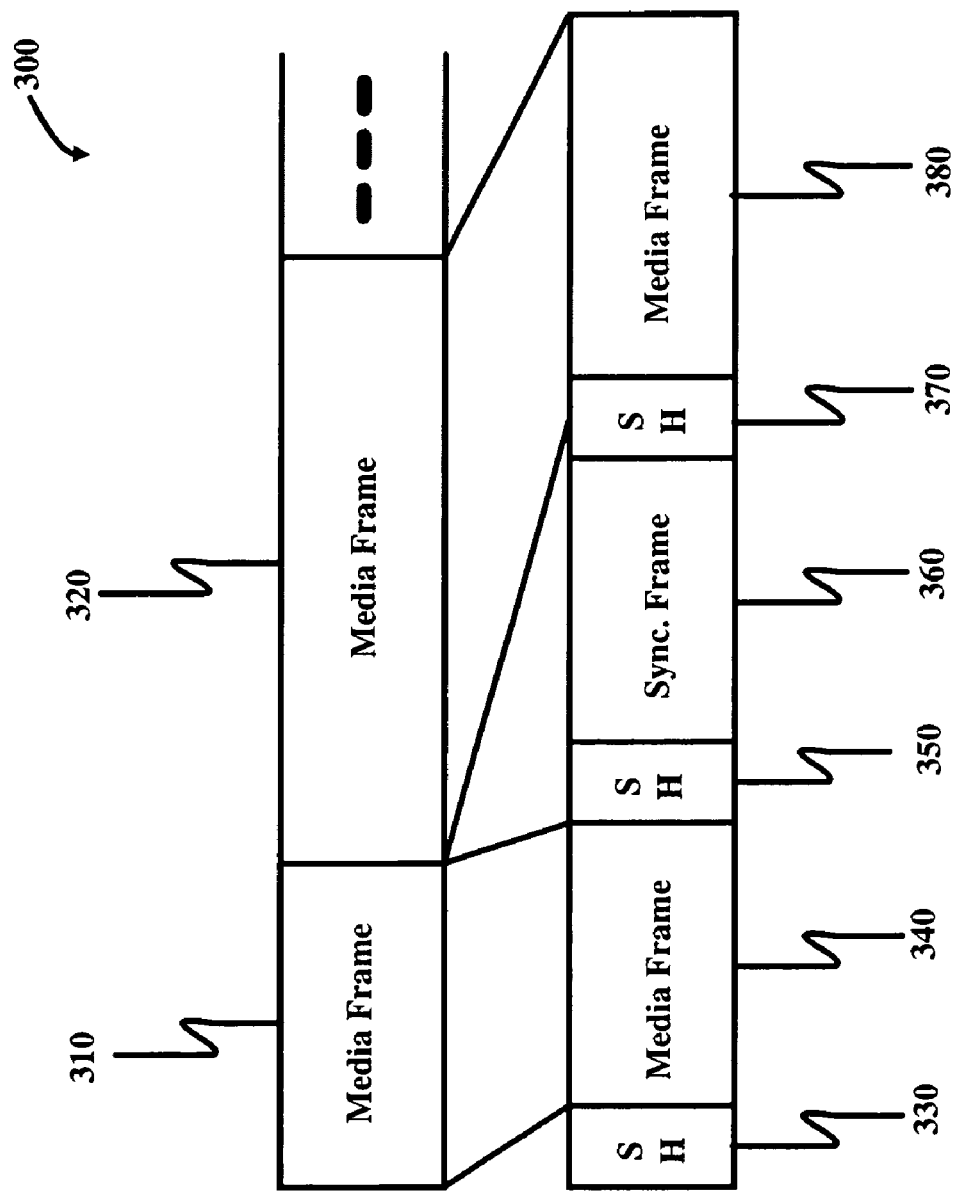
FIG. 5 is a block diagram illustrating the functions of a sync layer according to an embodiment herein.

The media adaptation layer 111 includes three sub-layers (no shown): (1) the sync layer uses sync headers (SH) as shown in FIG. 5 to provide synchronization within and between real-time flows such as audio, video, and timed data (additional control information), and to indicate the type of transmitted audio and video frames per frame. In other words whether the frame is (a) a random access point (RAP) frame, which is a complete frame taken as a reference (big size), and (b) is a non-RAP frame, which is the frame sent in the reference to a RAP frame containing only changes in the RAP frame (small size). The other sub-layers of the media adaptation layer 111 include: (2) the file delivery layer, which delivers files reliably over the network; and (3) the internet protocol (IP) adaptation layer, which manages the transport of IP packets over the transport layer and the mappings of IP addresses to flow IDs used to deliver IP data cast services over the network. Finally, the upper application layers 113 are responsible for media frames formatting and presentation.

Figure 4:
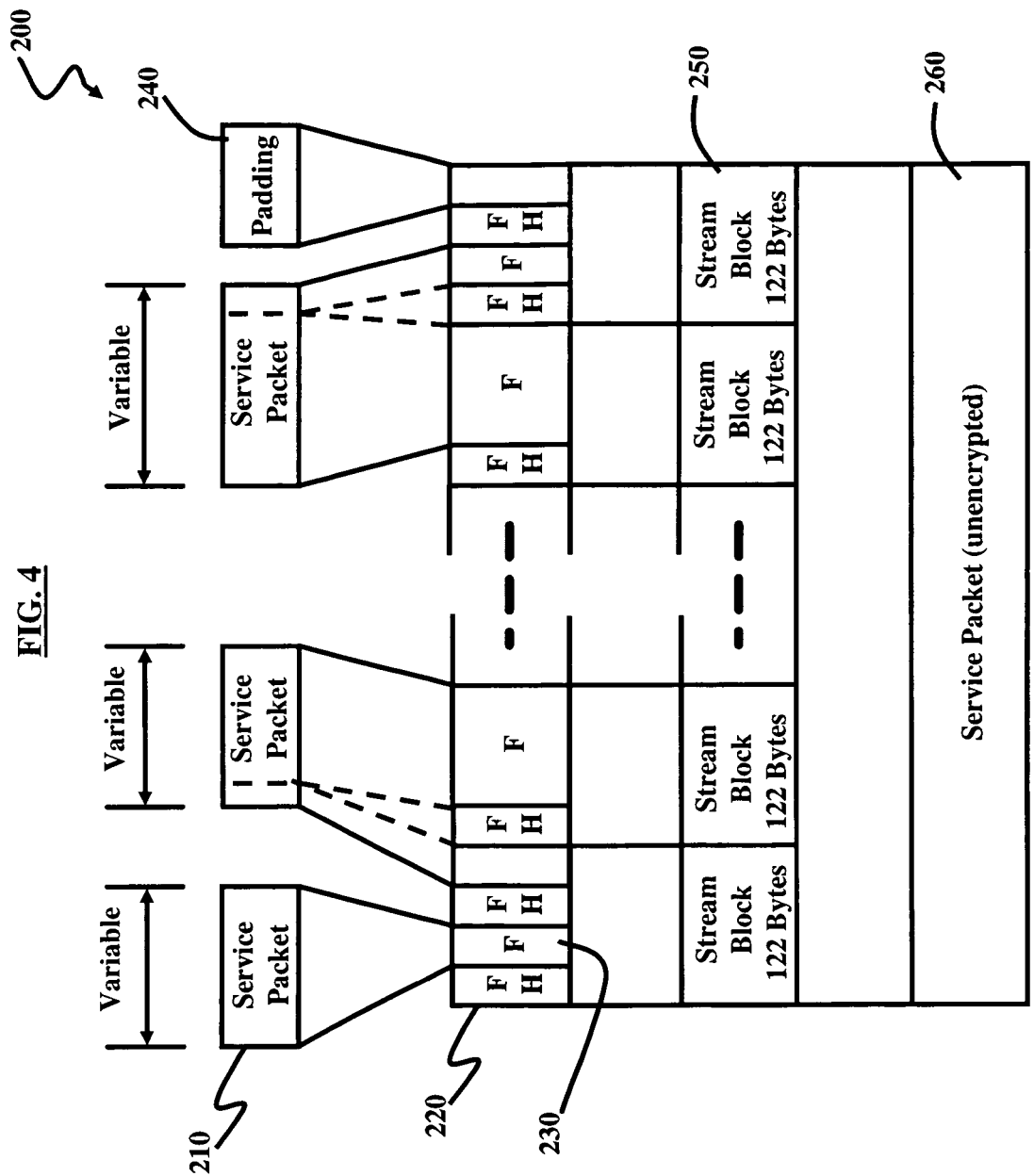
FIG. 4 is a block diagram illustrating the functions of a framing layer according to an embodiment herein.

The architecture of the framing layer 200 of FIG. 4 defines its breakage from unencrypted stream packet 260 into stream blocks 250 of 122 bytes and further into a fragment header (FH) 220, a fragment (F) 230, and padding 240. Fragment (F) 230 provides space for the service packet 210.

FIG. 5 maps the functioning of a sync layer 300, which is one of the three sub-layers of the media adaptation layer 111 of FIG. 3. The media frame 310 is divided into a sync header (SH) 330 and media frame 340. Similarly, media frame 320 is fragmented into sync header (SH) 350, sync frame 360, which is synchronization information sent as a frame, sync header (SH) 370, and media frame 380. The media frames 310, 320, 340, 380 are real-time flow data such as audio, video, or timed data, coming from upper application layers 113 (of FIG. 3). The sync layer (within the media adaptation layer 111 shown in FIG. 3) provides synchronization within and between real-time flows such as audio, video, or timed data when transmitted by the network 13 (of FIG. 1).

According to the embodiments herein, by examining the major real-time service processing operations, it is determined that these operations use more CPU cycles and less memory, thus it is desirable to perform these operations using hardware components only. Data that will be discarded by the protocol stack 100 (of FIG. 3) due to errors or certain algorithm constraints is not copied from the ASIC receiver memory 19, which saves time and bandwidth on a wireless data bus (not shown) connecting the ASIC receiver memory 19 and the host processor 17. Additionally, this saves memory space on the host processor 17 attached memory 18.

Figure 6:
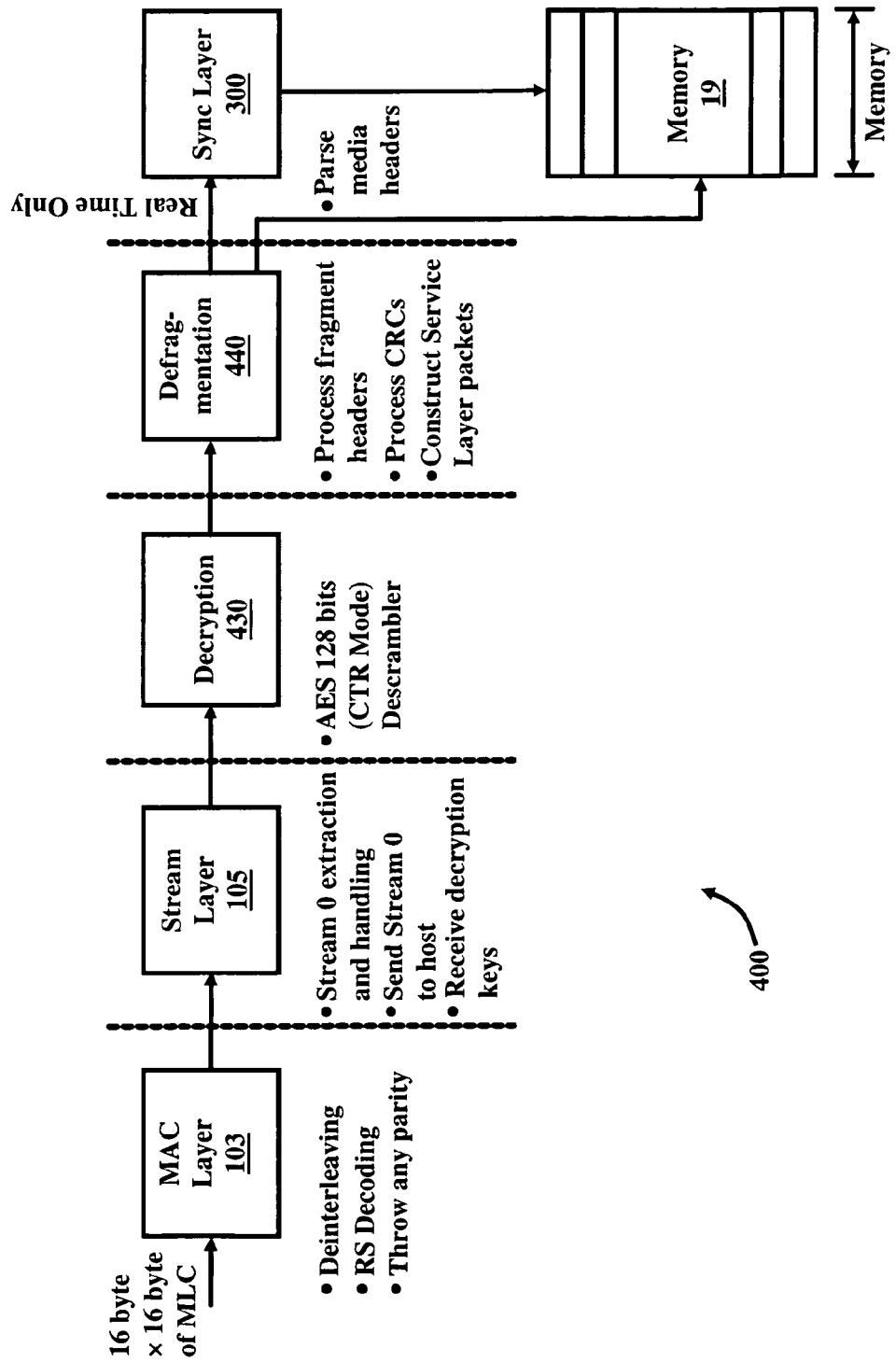
FIG. 6 is a block diagram of hardware components used in accordance with the embodiments herein.

Accordingly, the operations from the several layers in the protocol stack 100 of FIG. 3 is performed using hardware components in which each MLC is divided into blocks of 16 bytes and enter the hardware cores shown in FIG. 6. More specifically, the hardware components 400 that function based on the received digital data stream layer 105 (of FIG. 3) is shown in FIG. 6, with reference to FIGS. 1 through 5. These hardware components 400 reside on the ASIC memory 19 on the receiver 12. A MLC having a size of 16 bytes by 16 bytes is introduced to the MAC layer 103 which conducts (a) deinterleaving whose input is the data stream lengths and the particular transmission mode being used (i.e., the transmission mode may be a combination of the modulation mode and the code rate used); (b) RS decoding, whose input is error flags per MAC layer packet and the FEC rate being used; and (c) fulfills the removal of any parity bits.

Figure 7:
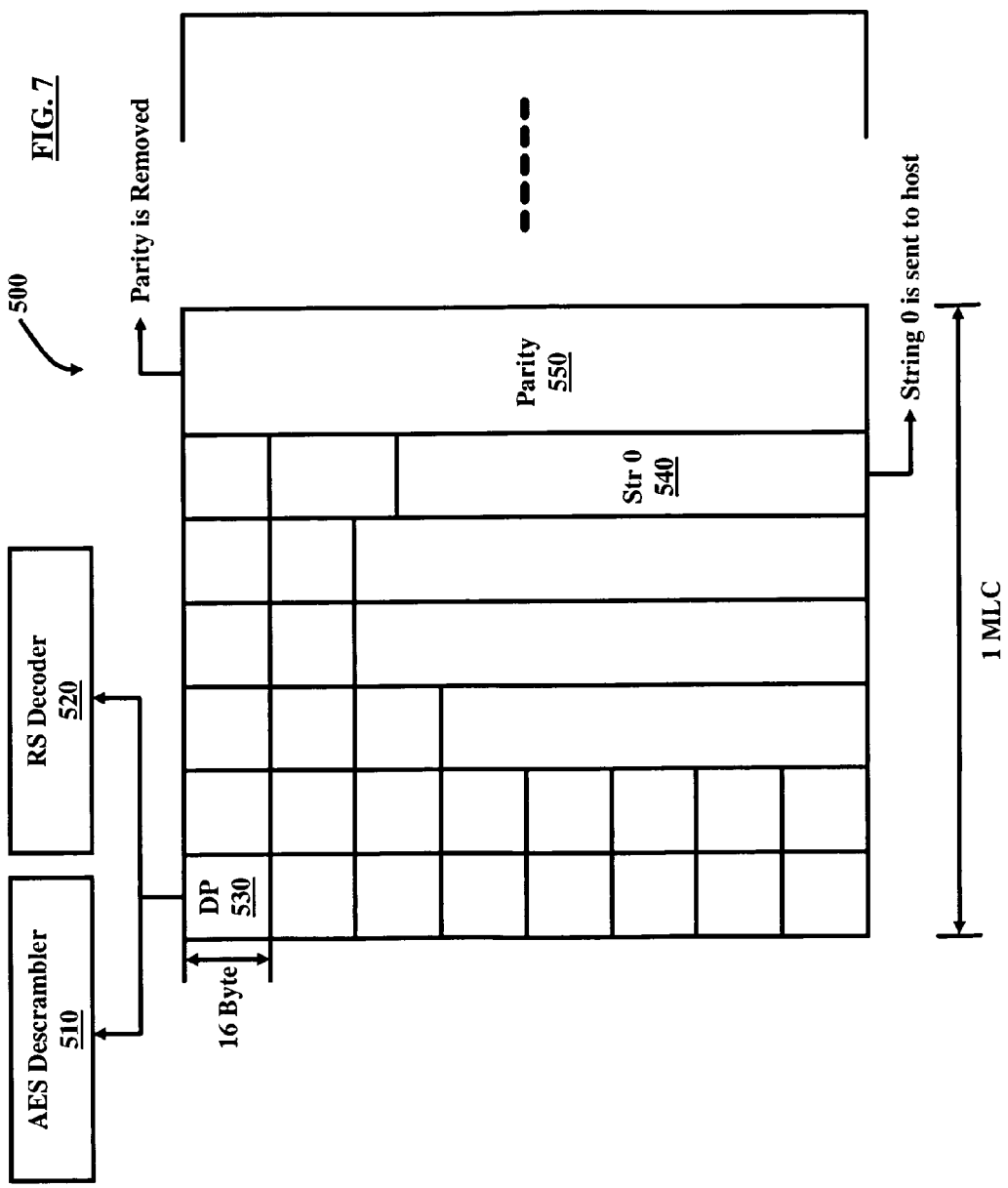
FIG. 7 is a schematic diagram illustrating processing in place in hardware memory according to an embodiment herein.

Then, the received stream goes to stream layer 105, which conducts stream 0 extractions and its handling, sends extracted stream 0 to the host 17, and receives a decryption key to begin the decryption process. As such, the stream layer core 105 must know the specific stream of the currently viewed real time service. Decryption core 430 applies an advance encryption standard (AES) using the received decryption key in order to conduct decryption on a block of 16 bytes of an MLC (as illustrated in FIG. 6). This 16-byte block is taken from the ASIC memory 19 and then the decrypted block is put in place (as illustrated in FIG. 7). In this regard, FIGS. 6 and 7 describe the same solution provided by the embodiments herein with FIG. 6 illustrating the general flow of the operation and which hardware components 400 are utilized and FIG. 7 illustrating how the stages shown in FIG. 6 are performed in place in memory 19.

Then, defragmentation (or deframing) core 440 removes the fragmentation header 220 at the start of each fragment 230 on the data stream undergoing processing, processes the CRCs, and constructs service layer packets. The defragmentation core 440 must know (a) whether a CRC option is being added through the FlowBLOB bits from lower layers, and (b) the length of each service packet 210 from the fragmentation header 220. Then, the defragmentation core 440 places this information in a service packet header 630 (shown in FIG. 8) at the start of each service packet 210, which is 3 bytes. Thereafter, for real time services only, the sync layer core 300 parses the sync header from which it detects whether the received frame is either a RAP frame or a non-RAP frame, and then the snyc layer core 300 performs the following:

First, if there is a channel switching event or an error event (errors may be signaled to the sync layer 300 by the transport layer 109 if they are detected at a lower layer or are detected by the CRC in the transport layer 109), the sync layer 300 retains the RAP version of a certain frame to be written in the memory 19 and overwrites over the memory address containing the non RAP version. Second, at normal operation, the sync layer 300 overwrites over the memory address containing the RAP version of the frame and keeps the non-RAP version to minimize the memory usage.

Accordingly, processing can also be performed in place on the same memory buffer and use very little (i.e., any extra space needed for storing addresses of different MLCs instead of storing MLCs once again after processing are processed in place (this extra needed memory is small compared to storing the memory needed for storing the MLC after processing)) temporary memory for processing as shown in FIG. 7, the structure of a MLC 500 is divided into pieces of 16-byte data packets (DP) 530. On each 16-byte MLC packet, AES descrambler 510 and RS decoder 520 are applied to process the received data stream. String 0 (block 540) is sent to the host 17 and parity byte 550 is removed from the MLC 500. The defragmentation layer 440 (of FIG. 6) removes the fragmentation header 220 (of FIG. 4) (one byte) and the CRC bits (two bytes optional) and then appends three bytes containing information about the service packet 210 (of FIG. 4) in place of the removed three bytes. The processing is performed in place meaning that the added new bytes must be equal to the removed bytes but in case the service packet 210 is composed of only one fragment 230 without CRC bytes (CRC is optional), at the end of the fragment 230. In other words, only one byte is removed and three bytes have to be added in the defragmentation layer 440.

The presence of these two extra free bytes per fragment 230 provides free space for the 3 bytes added in the defragmentation layer 440, even in the case mentioned above of only one fragment header byte removed, the extra two bytes allow the defragmentation layer 440 to write in place without any problem. There is a bit at the fragment header 220 which indicates if this fragment 230 is the last in the service packet 210 or not, so the three bytes of service packet header 630 (of FIG. 8) appended at the beginning are not ready.

After the processing is completed using hardware components (FIGS. 6 and 7), the software running on the host processor 17 is informed that the protocol stack processing is complete and reads the data components (i.e., audio, video, timed data) from the ASIC memory 19 and supplies the data components to a codec (not shown) to play the data components.

Figure 8:
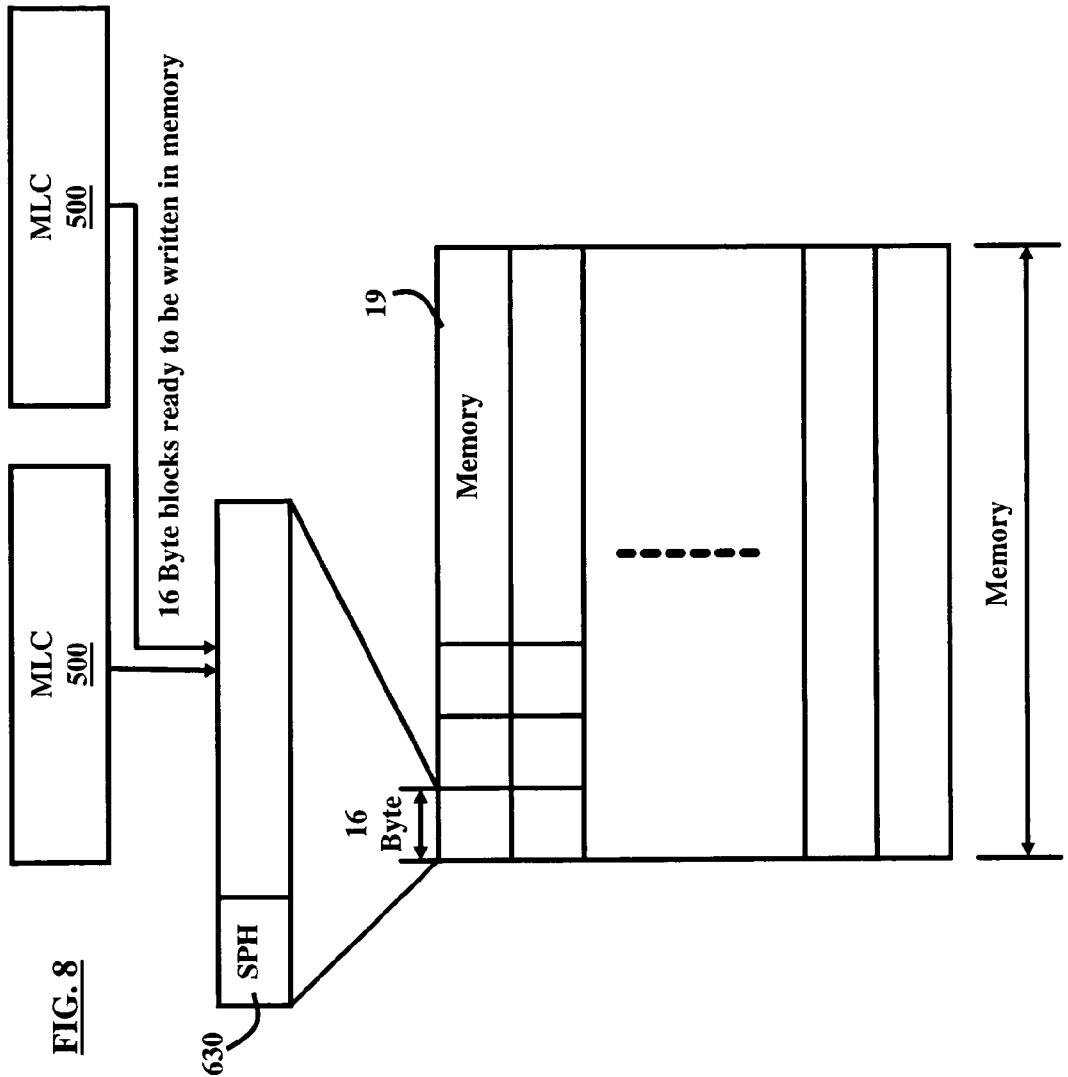
FIG. 8 is a schematic diagram illustrating of storing 16 bytes data blocks writing in hardware memory according to an embodiment herein.

The three bytes of the service packet header 630 remains empty and their address is saved in a known place in the memory 19 until the last fragment 230 of this service packet 210 is processed. At this point, the length of the service packet 210 is computed and the header information is ready, thus the address of the service packet header 630 will be re-entered from its known address and filled with meaningful information as shown in FIG. 8. In this context, with respect to "meaningful information," the actual length of the service packet 210 will replace the dummy bits of the service packet header 630 (as its address was stored to re-enter for this reason).

FIG. 8, with reference to FIGS. 1 through 7, illustrates an example of storing 16 bytes of MLCs 500 in memory 19. The 3-byte service packet header (SPH) 630 remains empty and is saved in another place in memory 19 until the last fragment 230 of the service packet 210 is processed and the length of the packet 210 is computed.

Figure 9:
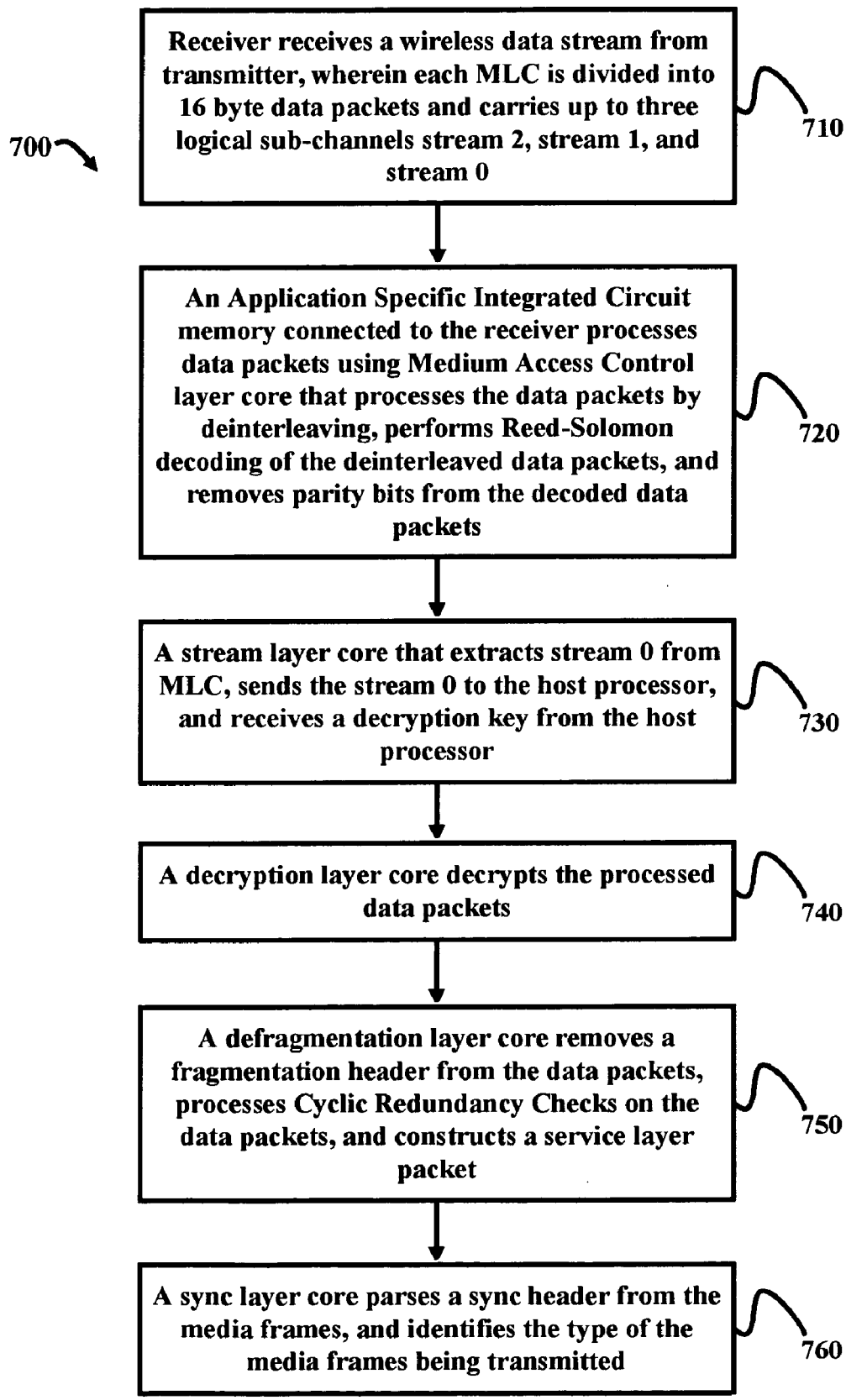
FIG. 9 is a flow diagram illustrating a preferred method according to an embodiment herein.

FIG. 9, with reference to FIGS. 1 through 8, illustrates a flow diagram of a method 700 for protocol stack layer processing for a MediaFLO™ (Forward Link Only) mobile multimedia multicast system comprising a transmitter 11 comprising a host processor 17 and a host memory component 18 according to an embodiment herein. The method comprises a receiver 12 that receives (710) a wireless data stream from the wireless network 13 comprising a MediaFLO™ mobile multimedia multicast system superframe 200 comprising any of audio, video, and text media frames arranged in multiplexed MLCs 500 received from the transmitter 11, wherein each MLC 500 is divided into 16 byte data packets 530, and wherein each MLC carries up to three logical sub-channels comprising stream 2, stream 1, and stream 0; and an Application ASIC memory component 19 operatively connected to the receiver 12, wherein the ASIC memory component 19 performs processing (720) of the data packets using hardware components comprising a MAC layer core 103 that processes the data packets by deinterleaving the data packets, performing RS decoding 520 of the deinterleaved data packets, and removing parity bits 550 from decoded data packets; a stream layer core 105 that extracts (730) the stream 0 from MLC, sends the stream 0 to the host processor, and receives a decryption key from the host processor; a decryption layer core 430 that decrypts (740) the processed data packets; a defragmentation layer core 440 that removes (750) a fragmentation header 220 located at a beginning of each fragment of the data packets, processes CRCs on the data packets, and constructs a service layer packet; and a sync layer core 300 that parses (760) a sync header from the media frames, and identifies the type of the media frames being transmitted.

Preferably, upon completion of the parsing process performed by the sync layer core 300, the receiver 12 informs the host processor 17 for reading data components of the wireless data stream from the ASIC memory component 19, wherein the host processor 17 provides the data components to a codec to decode and play any of audio, video, and text media content. Furthermore, the type of the media frames being transmitted comprises any of a RAP frame and a non-RAP frame, wherein when there is any of a channel switching event and an error event, the sync layer 300 retains a RAP version of a particular frame to be written in the ASIC memory component 19 and overwrites memory containing a non-RAP version of the particular frame, and wherein the sync layer 300 overwrites memory containing a RAP version of a particular frame to be written in the ASIC memory component 19, and retains a non-RAP version of the particular frame.

The processing (720) is performed in place in the ASIC memory component 19, wherein the in place indicates that only one byte is removed and three bytes are added in the defragmentation layer core 440, wherein the decryption layer core 430 decrypts the processed data packets using decryption keys using an AES 128 bits counter mode descrambler 510; the defragmentation layer core 440 determines a length of each service packet 210 from a respective fragmentation header 220, and places three empty bytes in place of the removed bytes in a service packet header 630, wherein the defragmentation layer core 440 saves a memory address of the placed three empty bytes in the ASIC memory component 19 separately; processes fragments of a current data packet until a last fragment is processed; computes a length of the processed service packet; re-enters the three empty bytes in the memory address of the service packet header 630 from its saved address; configures fragment headers bit containing the last fragment information; and places service packet length information in the service packet header 630.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
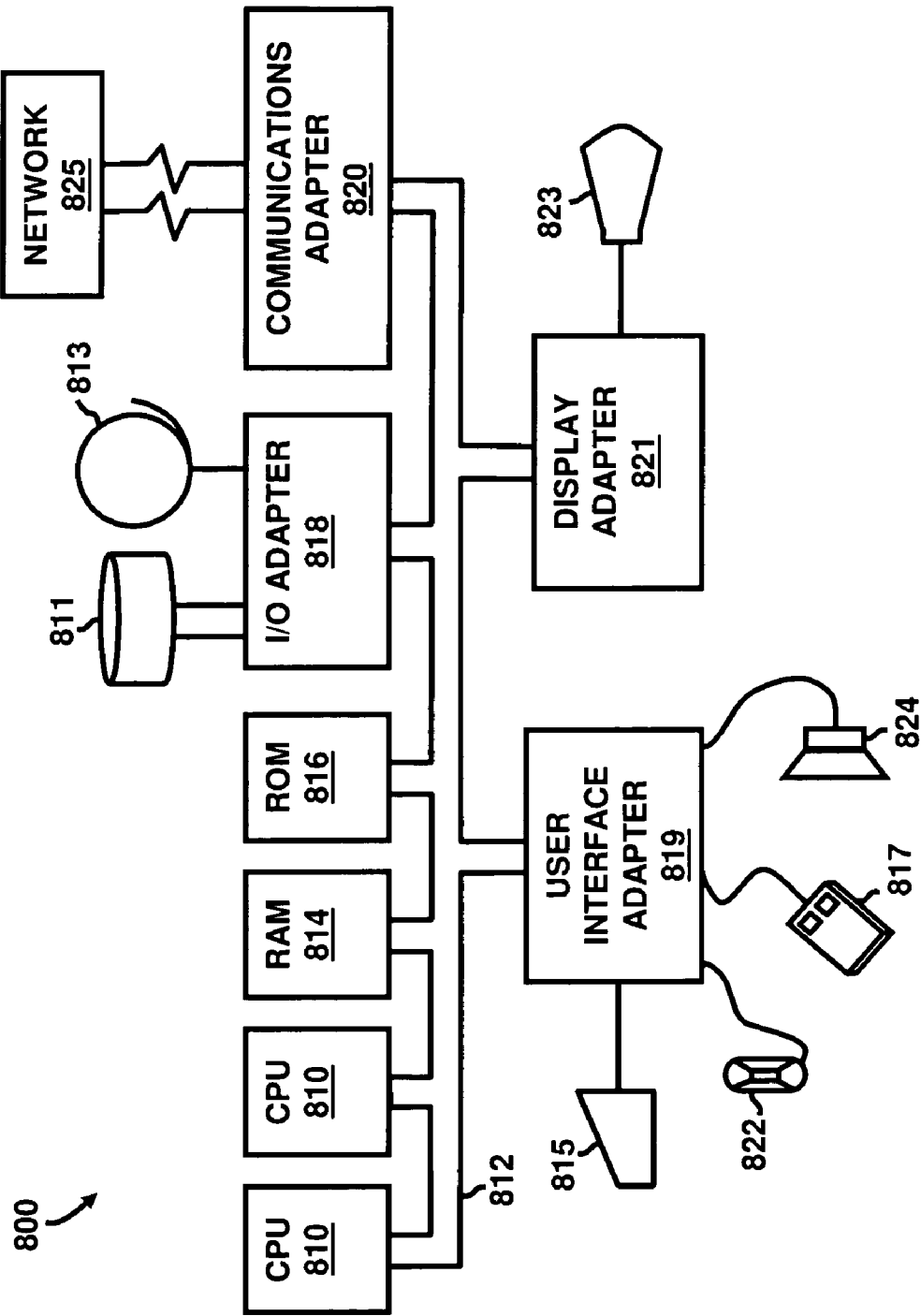
FIG. 10 is a schematic diagram illustrating a computer architecture used in accordance with the embodiments herein.

A representative hardware environment for practicing the embodiments herein is depicted in FIG. 10. This schematic drawing illustrates a hardware configuration of an information handling/computer system 800 in accordance with the embodiments herein. The system 800 comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system 800. The system 800 can read the inventive instructions on the program storage devices and follow these instructions to execute the methodology of the embodiments herein. The system 800 further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example.

The embodiments herein decrease the size of the data transferred from the demodulator (not shown) to the host processor 17 and optimizes the total processing conducted by the host. The embodiments herein conduct processing without increasing the complexity of the hardware component and simultaneously reduces significantly the memory usage and battery consumption of the receiver 12.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus that performs protocol stack layer processing for a mobile multimedia multicast system comprising a transmitter comprising a host processor and a host memory component, said apparatus comprising:

a receiver that receives a wireless data stream comprising a mobile multimedia multicast system superframe comprising any of audio, video, and text media frames arranged in multiplexed Multicast Logical Channels (MLCs) and received from said transmitter, wherein each MLC is divided into 16 byte data packets, and wherein each MLC carries up to three logical sub-channels comprising stream 2, stream 1, and stream 0; and an Application Specific Integrated Circuit (ASIC) memory component operatively connected to said receiver, wherein said ASIC memory component performs processing of said data packets using hardware components comprising:

a Medium Access Control (MAC) layer core that processes said data packets by deinterleaving said data packets, performing Reed-Solomon (RS) decoding of the deinterleaved data packets, and removing parity bits from the decoded data packets;

a stream layer core that extracts said stream 0 from said MLC, sends said stream 0 to said host processor, and receives a decryption key from said host processor;

a decryption layer core that decrypts the processed data packets;

a defragmentation layer core that removes a fragmentation header located at a beginning of each fragment of said data packets, processes Cyclic Redundancy Checks (CRCs) on said data packets, and constructs a service layer packet; and a sync layer core that parses a sync header from said media frames, and identifies the type of said media frames being transmitted, wherein said type of said media frames being transmitted comprises any of a random access point (RAP) frame and a non-RAP frame, wherein said processing is performed in place in said ASIC memory component, wherein said in place indicates that only one byte is removed and three bytes are added in said defragmentation layer core, and wherein said decryption layer core decrypts said processed data packets using decryption keys using an Advance Encryption Standard (AES) 128 bits counter mode descrambler.

2. The apparatus of claim 1, wherein upon completion of the parsing process performed by said sync layer core, said receiver informs said host processor for reading data components of said wireless data stream from said ASIC memory component.

3. The apparatus of claim 2, wherein said host processor provides said data components to a codec to decode and play any of audio, video, and text media content.

4. The apparatus of claim 1, wherein when there is any of a channel switching event and an error event, said sync layer retains a RAP version of a particular frame to be written in said ASIC memory component and overwrites memory containing a non-RAP version of said particular frame.

5. The apparatus of claim 1, wherein said sync layer overwrites memory containing a RAP version of a particular frame to be written in said ASIC memory component, and retains a non-RAP version of said particular frame.

6. The apparatus of claim 1, wherein said defragmentation layer core determines a length of each service packet from a respective fragmentation header, and places three empty bytes in place of the removed bytes in a service packet header.

7. The apparatus of claim 6, wherein said defragmentation layer core:

saves a memory address of said placed three empty bytes in said ASIC memory component separately;

processes fragments of a current data packet until a last fragment is processed;

computes a length of the processed service packet;

re-enters the three empty bytes in the memory address of said service packet header from its saved address;

configures fragment headers bit containing the last fragment information; and places service packet length information in said service packet header.

8. A method of performing protocol stack layer processing for a mobile multimedia multicast system comprising a transmitter comprising a host processor and a host memory component, said method comprising:

receiving, in a receiver, a wireless data stream comprising a mobile multimedia multicast system superframe comprising any of audio, video, and text media frames arranged in multiplexed Multicast Logical Channels (MLCs) and received from said transmitter, wherein each MLC is divided into 16 byte data packets, and wherein each MLC carries up to three logical sub-channels comprising stream 2, stream 1, and stream 0; and processing said data packets in an Application Specific Integrated Circuit (ASIC) memory component operatively connected to said receiver, wherein said ASIC memory component comprises:

a Medium Access Control (MAC) layer core that processes said data packets by deinterleaving said data packets, performing Reed-Solomon (RS) decoding of the deinterleaved data packets, and removing parity bits from the decoded data packets;

a stream layer core that extracts said stream 0 from said MLC, sends said stream 0 to said host processor, and receives a decryption key from said host processor;

a decryption layer core that decrypts the processed data packets;

a defragmentation layer core that removes a fragmentation header located at a beginning of each fragment of said data packets, processes Cyclic Redundancy Checks (CRCs) on said data packets, and constructs a service layer packet; and a sync layer core that parses a sync header from said media frames, and identifies the type of said media frames being transmitted, wherein said type of said media frames being transmitted comprises any of a random access point (RAP) frame and a non-RAP frame, wherein said processing is performed in place in said ASIC memory component, wherein said in place indicates that only one byte is removed and three bytes are added in said defragmentation layer core, and wherein said decryption layer core decrypts said processed data packets using decryption keys using an Advance Encryption Standard (AES) 128 bits counter mode descrambler.

9. The method of claim 8, wherein upon completion of the parsing process performed by said sync layer core, said receiver informs said host processor for reading data components of said wireless data stream from said ASIC memory component.

10. The method of claim 9, wherein said host processor provides said data components to a codec to decode and play any of audio, video, and text media content.

11. The method of claim 8, wherein when there is any of a channel switching event and an error event, said sync layer retains a RAP version of a particular frame to be written in said ASIC memory component and overwrites memory containing a non-RAP version of said particular frame.

12. The method of claim 8, wherein said sync layer overwrites memory containing a RAP version of a particular frame to be written in said ASIC memory component, and retains a non-RAP version of said particular frame.

13. The method of claim 8, wherein said defragmentation layer core determines a length of each service packet from a respective fragmentation header, and places three empty bytes in place of the removed bytes in a service packet header.

14. The method of claim 13, wherein said defragmentation layer core:
- saves a memory address of the placed three empty bytes in said ASIC memory component separately;
- processes fragments of a current data packet until a last fragment is processed;
- computes a length of the processed service packet;
- re-enters the three empty bytes in the memory address of said service packet header from its saved address;
- configures fragment headers bit containing the last fragment information; and
- places service packet length information in said service packet header.

15. An apparatus that performs protocol stack layer processing for a mobile multimedia multicast system, said apparatus comprising:
- a receiver that receives a wireless data stream comprising a mobile multimedia multicast system superframe comprising any of audio, video, and text media frames arranged in multiplexed Multicast Logical Channels (MLCs), wherein each MLC is divided into 16 byte data packets, and wherein each MLC carries up to three logical sub-channels comprising stream 2, stream 1, and stream 0; and
- an Application Specific Integrated Circuit (ASIC) memory component operatively connected to said receiver, wherein said ASIC memory component performs processing of said data packets using hardware components comprising:
  - a Medium Access Control (MAC) layer core that processes said data packets by deinterleaving said data packets, performing Reed-Solomon (RS) decoding of the deinterleaved data packets, and removing parity bits from the decoded data packets;
  - a stream layer core that extracts said stream 0 from said MLC, sends said stream 0 to a processing device, and receives a decryption key from said processing device;
  - a decryption layer core that decrypts the processed data packets;
  - a defragmentation layer core that removes a fragmentation header located at a beginning of each fragment of said data packets, processes Cyclic Redundancy Checks (CRCs) on said data packets, and constructs a service layer packet; and
  - a sync layer core that parses a sync header from said media frames, and identifies the type of said media frames being transmitted,
  - wherein said type of said media frames being transmitted comprises any of a random access point (RAP) frame and a non-RAP frame,
  - wherein said processing is performed in place in said ASIC memory component, wherein said in place indicates that only one byte is removed and three bytes are added in said defragmentation layer core, and
  - wherein said decryption layer core decrypts said processed data packets using decryption keys using an Advance Encryption Standard (AES) 128 bits counter mode descrambler.

16. The apparatus of claim 15, wherein upon completion of the parsing process performed by said sync layer core, said receiver informs said processing device for reading data components of said wireless data stream from said ASIC memory component.

17. The apparatus of claim 16, wherein said processing device provides said data components to a codec to decode and play any of audio, video, and text media content.

18. The apparatus of claim 15, wherein when there is any of a channel switching event and an error event, said sync layer retains a RAP version of a particular frame to be written in said ASIC memory component and overwrites memory containing a non-RAP version of said particular frame.

19. The apparatus of claim 15, wherein said sync layer overwrites memory containing a RAP version of a particular frame to be written in said ASIC memory component, and retains a non-RAP version of said particular frame.

20. The apparatus of claim 15, wherein said defragmentation layer core determines a length of each service packet from a respective fragmentation header, and places three empty bytes in place of the removed bytes in a service packet header, and wherein said defragmentation layer core:
- saves a memory address of said placed three empty bytes in said ASIC memory component separately;
- processes fragments of a current data packet until a last fragment is processed;
- computes a length of the processed service packet;
- re-enters the three empty bytes in the memory address of said service packet header from its saved address;
- configures fragment headers bit containing the last fragment information; and
- places service packet length information in said service packet header.

* * * * *